US012755168B2

(12) United States Patent
Hsiung et al.

(10) Patent No.: US 12,755,168 B2
(45) Date of Patent: Oct. 6, 2026

(54) ENDPOINT DETECTION IN MANUFACTURING PROCESS BY NEAR INFRARED SPECTROSCOPY AND MACHINE LEARNING TECHNIQUES

(71) Applicant: VIAVI Solutions Inc., San Jose, CA (US)

(72) Inventors: Changmeng Hsiung, Redwood City, CA (US); Peng Zou, Ridgefield, CT (US); Lan Sun, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 645 days.

(21) Appl. No.: 17/301,427

(22) Filed: Apr. 2, 2021

(65) Prior Publication Data

US 2021/0224672 A1 Jul. 22, 2021

Related U.S. Application Data

(63) Continuation of application No. 15/586,678, filed on May 4, 2017, now Pat. No. 10,984,334.

(51) Int. Cl.
*G06N 5/04* (2023.01)
*G06N 20/00* (2019.01)
*G06N 20/10* (2019.01)

(52) U.S. Cl.
CPC ............... *G06N 5/04* (2013.01); *G06N 20/00* (2019.01); *G06N 20/10* (2019.01)

(58) Field of Classification Search
CPC .......... G06N 5/04; G06N 20/00; G06N 20/10; G06N 20/20; G06F 18/2411; G06F 18/214; G01N 21/359
See application file for complete search history.

(56) References Cited

U.S. PATENT DOCUMENTS

| | | | |
|---|---|---|---|
| 7,840,287 | B2 | 11/2010 | Wojsznis et al. |
| 7,856,281 | B2 | 12/2010 | Thiele et al. |

(Continued)

FOREIGN PATENT DOCUMENTS

| | | |
|---|---|---|
| CN | 101055468 A | 10/2007 |
| CN | 101807048 A | 8/2010 |

(Continued)

OTHER PUBLICATIONS

Peinado, Development validation and transfer of a Near Infrared method to determine in-line the endpoint of a fluidised drying process for commercial production batches of an approved oral solid dose pharmaceutical product (Year: 2010).*

(Continued)

*Primary Examiner* — Tewodros E Mengistu
(74) *Attorney, Agent, or Firm* — Foley & Lardner LLP

(57) ABSTRACT

A device may receive training spectral data associated with a manufacturing process that transitions from an unsteady state to a steady state. The device may generate, based on the training spectral data, a plurality of iterations of a support vector machine (SVM) classification model. The device may determine, based on the plurality of iterations of the SVM classification model, a plurality of predicted transition times associated with the manufacturing process. A predicted transition time, of the plurality of predicted transition times, may identify a time, during the manufacturing process, that a corresponding iteration of the SVM classification model predicts that the manufacturing process transitioned from the unsteady state to the steady state. The device may generate, based on the plurality of predicted transition times, a final SVM classification model associated with determining whether the manufacturing process has reached the steady state.

20 Claims, 12 Drawing Sheets

(56) References Cited

U.S. PATENT DOCUMENTS

| | | | | |
|---|---|---|---|---|
| 8,489,632 | B1 | 7/2013 | Breckenridge et al. | |
| 9,069,345 | B2 * | 6/2015 | McCready | G05B 13/048 |
| 10,339,464 | B2 | 7/2019 | Martin et al. | |
| 10,984,334 | B2 | 4/2021 | Hsiung et al. | |
| 2004/0034612 | A1 * | 2/2004 | Mathewson | G06Q 10/06 706/46 |
| 2006/0064415 | A1 * | 3/2006 | Guyon | G16B 40/10 |
| 2007/0282766 | A1 | 12/2007 | Hartman et al. | |
| 2008/0097940 | A1 * | 4/2008 | Ben-Hur | G06F 18/2411 706/12 |
| 2008/0161958 | A1 * | 7/2008 | Davidson | G05B 23/0286 700/109 |
| 2009/0327172 | A1 * | 12/2009 | Liu | G06N 20/00 706/12 |
| 2010/0205124 | A1 | 8/2010 | Ben-Hur et al. | |
| 2010/0213953 | A1 * | 8/2010 | Yang | G01N 27/22 324/664 |
| 2012/0143655 | A1 | 6/2012 | Sunaoshi et al. | |
| 2013/0144908 | A1 | 6/2013 | Geroulo | |
| 2014/0080172 | A1 | 3/2014 | Tunheim et al. | |
| 2014/0345153 | A1 * | 11/2014 | Pahwa | F26B 21/083 34/524 |
| 2015/0276482 | A1 * | 10/2015 | Lednev | G01N 33/6896 356/301 |
| 2017/0059480 | A1 | 3/2017 | Hsiung et al. | |
| 2017/0322148 | A1 | 11/2017 | Preiner et al. | |
| 2018/0182632 | A1 | 6/2018 | Feng et al. | |

FOREIGN PATENT DOCUMENTS

| | | | |
|---|---|---|---|
| CN | 103439933 | A | 12/2013 |
| CN | 103971015 | A | 8/2014 |
| CN | 104376325 | A | 2/2015 |
| CN | 104508671 | A | 4/2015 |
| CN | 105026902 | A | 11/2015 |
| CN | 105809203 | A | 7/2016 |
| CN | 105866056 | A | 8/2016 |
| CN | 106404748 | A | 2/2017 |
| EP | 1992939 | A1 | 11/2008 |
| JP | 2003529131 | A | 9/2003 |
| JP | 2005528585 | A | 9/2005 |
| JP | 2006048429 | A | 2/2006 |
| JP | 2009003638 | A | 1/2009 |
| JP | 2010128947 | A | 6/2010 |
| JP | 2010527017 | A | 8/2010 |
| JP | 2016075692 | A | 5/2016 |
| JP | 2017049246 | A | 3/2017 |
| KR | 20170026228 | A | 3/2017 |
| TW | 201243738 | A | 11/2012 |
| TW | 201303618 | A | 1/2013 |
| WO | 03053204 | A2 | 7/2003 |
| WO | 2005099875 | A1 | 10/2005 |
| WO | 2007131185 | A2 | 11/2007 |
| WO | 2014042919 | A1 | 3/2014 |

OTHER PUBLICATIONS

Zacour, Efficient Near Infrared Spectroscopic Calibration Methods (Year: 2011).*

Khorasani, Detecting Blending End-Point Using Mean Squares Successive Difference Test and Near-Infrared Spectroscopy (Year: 2015).*

Extended European Search Report for Application No. EP18169900, mailed on Oct. 2, 2018, 10 pages.

Pascual X., et al., "Data-driven models of steady state and transient operations of spiral-wound RO plant," Desalination, 2013, vol. 316, pp. 154-161.

Laurent et al., "Charge Dynamics and Its Energetic Features in Polymeric Materials," IEEE, 2013, vol. 20(2), pp. 357-381.

Extended European Search Report for European Application No. EP24189011 dated Oct. 17, 2024, 11 pages.

* cited by examiner

500

550

700

800

ENDPOINT DETECTION IN MANUFACTURING PROCESS BY NEAR INFRARED SPECTROSCOPY AND MACHINE LEARNING TECHNIQUES

RELATED APPLICATION

This application is a continuation of U.S. patent application Ser. No. 15/586,678, filed May 4, 2017 (now U.S. Pat. No. 10,984,334), which is incorporated herein by reference in its entirety.

BACKGROUND

As part of implementing a manufacturing process (e.g., a continuous manufacturing process, a batch manufacturing process), a process analytical technology (PAT) system may be utilized to produce real-time or near real-time data (e.g., spectral data) that allows for monitoring and control of the manufacturing process. A continuous manufacturing process allows raw materials to be input into a system and a finished product (e.g., a pharmaceutical product) to be discharged from the system in a continuous fashion. In other words, in a continuous manufacturing process, individual steps of the manufacturing process are transformed to a single, integrated manufacturing process (e.g., rather than a series of discrete steps as with a batch manufacturing process)

SUMMARY

According to some possible implementations, a device may include one or more processors to: receive training spectral data associated with a manufacturing process that transitions from an unsteady state to a steady state; generate, based on the training spectral data, a plurality of iterations of a support vector machine (SVM) classification model; determine, based on the plurality of iterations of the SVM classification model, a plurality of predicted transition times associated with the manufacturing process, where a predicted transition time, of the plurality of predicted transition times, may identify a time, during the manufacturing process, that a corresponding iteration of the SVM classification model predicts that the manufacturing process transitioned from the unsteady state to the steady state; and generate, based on the plurality of predicted transition times, a final SVM classification model associated with determining whether the manufacturing process has reached the steady state.

According to some possible implementations, a non-transitory computer-readable medium may store one or more instructions that, when executed by one or more processors, cause the one or more processors to: receive training spectral data associated with a first performance of a manufacturing process that transitions from an unsteady state to a steady state; iteratively generate, based on the training spectral data, a SVM classification model associated with determining whether another performance of the manufacturing process has transitioned from the unsteady state to the steady state; receive additional spectral data associated with a second performance of the manufacturing process; and determine, based on the SVM classification model and the additional spectral data, whether the second performance of the manufacturing process has transitioned from the unsteady state to the steady state.

According to some possible implementations, a method may include: receiving, by a device, first spectral data associated with a first performance of a manufacturing process that transitions from an unsteady state to a steady state; generating, by the device and based on the first spectral data, a plurality of iterations of a SVM classification model; determining, by the device and based on the plurality of iterations of the SVM classification model, a plurality of predicted transition times associated with the first performance of the manufacturing process; generating, by the device and based on the plurality of predicted transition times, a final SVM classification model associated with determining whether another performance of the manufacturing process has reached the steady state; receiving, by the device, second spectral data associated with a second performance of the manufacturing process; and determining, by the device, whether the second performance of the manufacturing process has reached the steady state based on the final SVM classification model and the second spectral data.

DETAILED DESCRIPTION

Figure 1A:
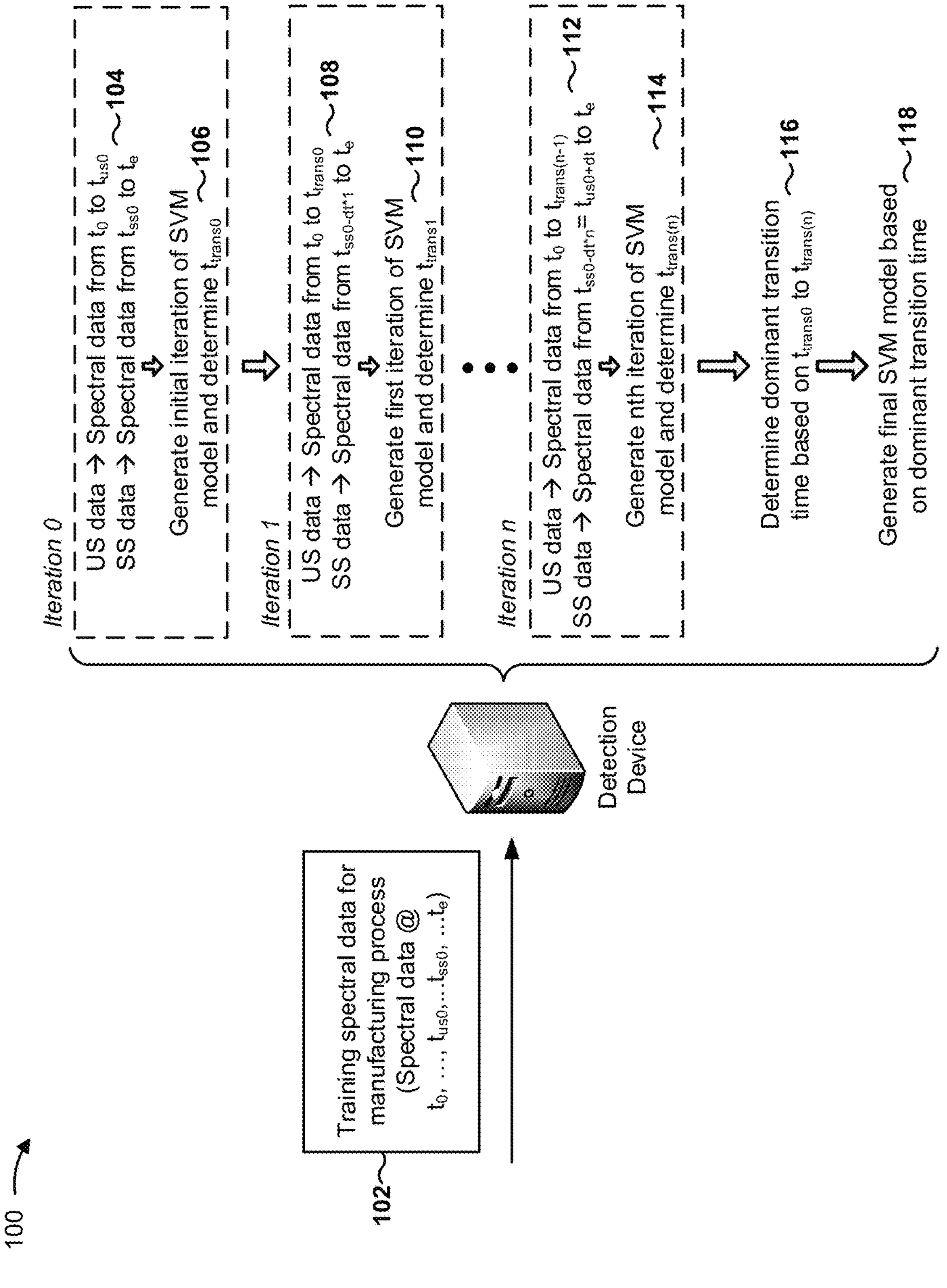
FIGS. 1A-1C are diagrams of an overview of an example implementation described herein.

The following detailed description of example implementations refers to the accompanying drawings. The same reference numbers in different drawings may identify the same or similar elements.

A manufacturing process (e.g., a continuous manufacturing process or a batch manufacturing process for manufacturing pharmaceutical products) may involve one or more transitions in state, such as a transition from an unsteady state (e.g., a state at which properties of materials and/or a compound vary with time) to a steady state (e.g., a state at which the properties of the materials and/or the compound remain substantially constant with time). For example, a mixing process, included in a manufacturing process for manufacturing a pharmaceutical product, may involve a transition where spectral properties of a compound transition from an unsteady state (e.g., at a start of the mixing process) to a steady state (e.g., indicating that the mixing process is complete).

Thus, in order to improve efficiency and/or optimize the manufacturing process, the manufacturing process should be monitored in order to determine (e.g., in real-time or near real-time) when the manufacturing process has reached the steady state. A possible technique for detecting a state of the manufacturing process is a model that uses a univariate technique that detects the state of the manufacturing process based on a single variable associated with the manufacturing process, such as a total spectral intensity. Another possible technique for detecting the state of the manufacturing process is a model that uses a principal component analysis (PCA) technique to identify a set of variables (i.e., principal components) for detecting the state of the manufacturing process, and detecting when the manufacturing process has reached the steady state based on monitoring the set of variables. However, in some cases, data measured during the manufacturing process may be multivariate data (e.g., NIR spectra including data associated with hundreds of variables). Thus, due to the focus on relatively few variables according to the univariate technique or the PCA technique, these techniques may lead to inaccurate state detections and/or may not be sufficiently robust in order to ensure accurate state detection.

Implementations described herein provide a detection device capable of generating a support vector machine (SVM) classification model for determining whether a manufacturing process (e.g., a continuous manufacturing process, a batch manufacturing process, and/or the like) has reached a steady state, and determining, using the SVM classification model and based on multivariate spectral data associated with the manufacturing process, whether the manufacturing process has reached the steady state. In some implementations, the SVM classification model may take into account multiple variables (e.g., 80 variables, 120 variables, 150 variables, and/or the like), thereby increasing accuracy and/or robustness of the SVM classification model (e.g., as compared to the techniques described above).

Figure 1B:
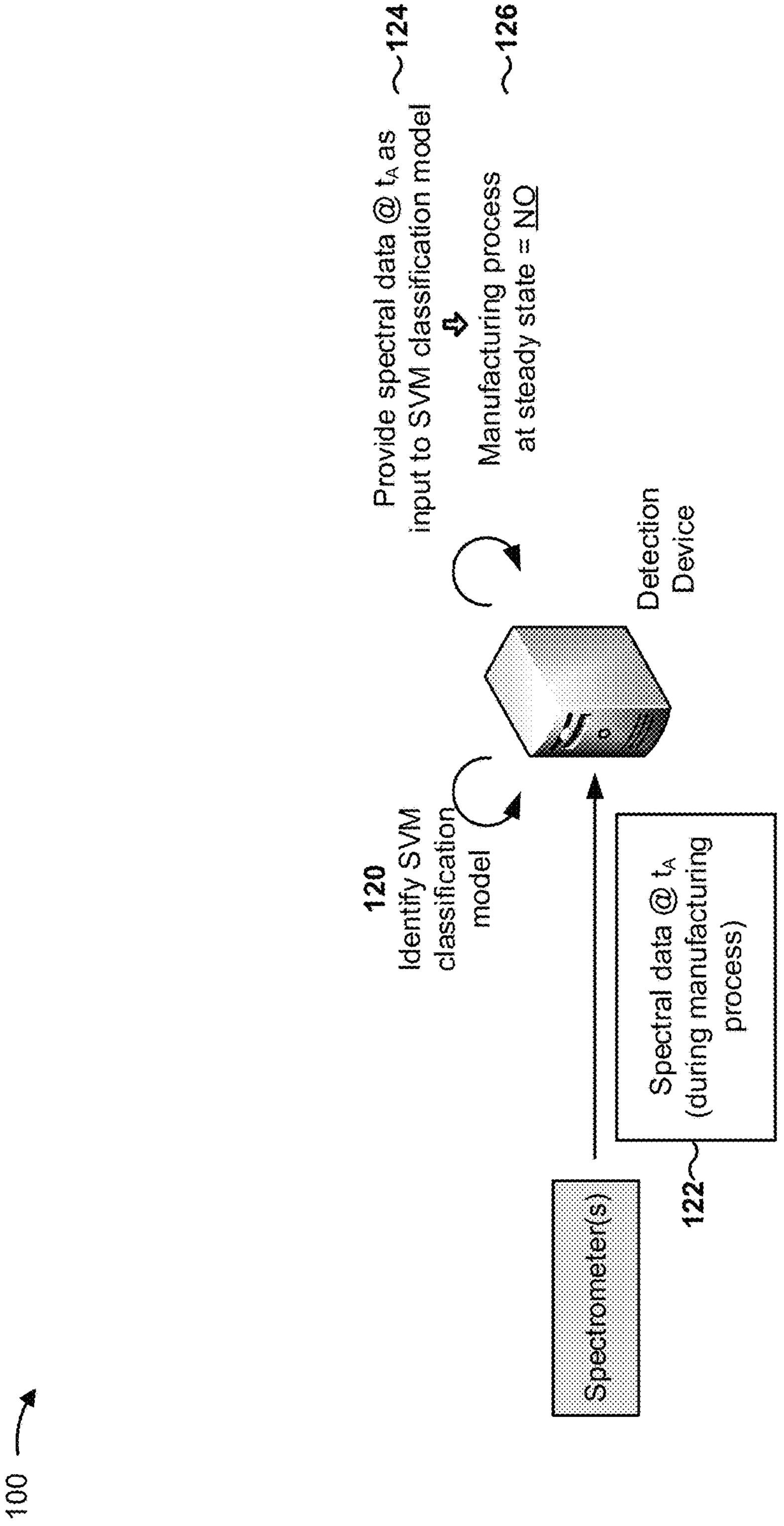
Figure 1C:
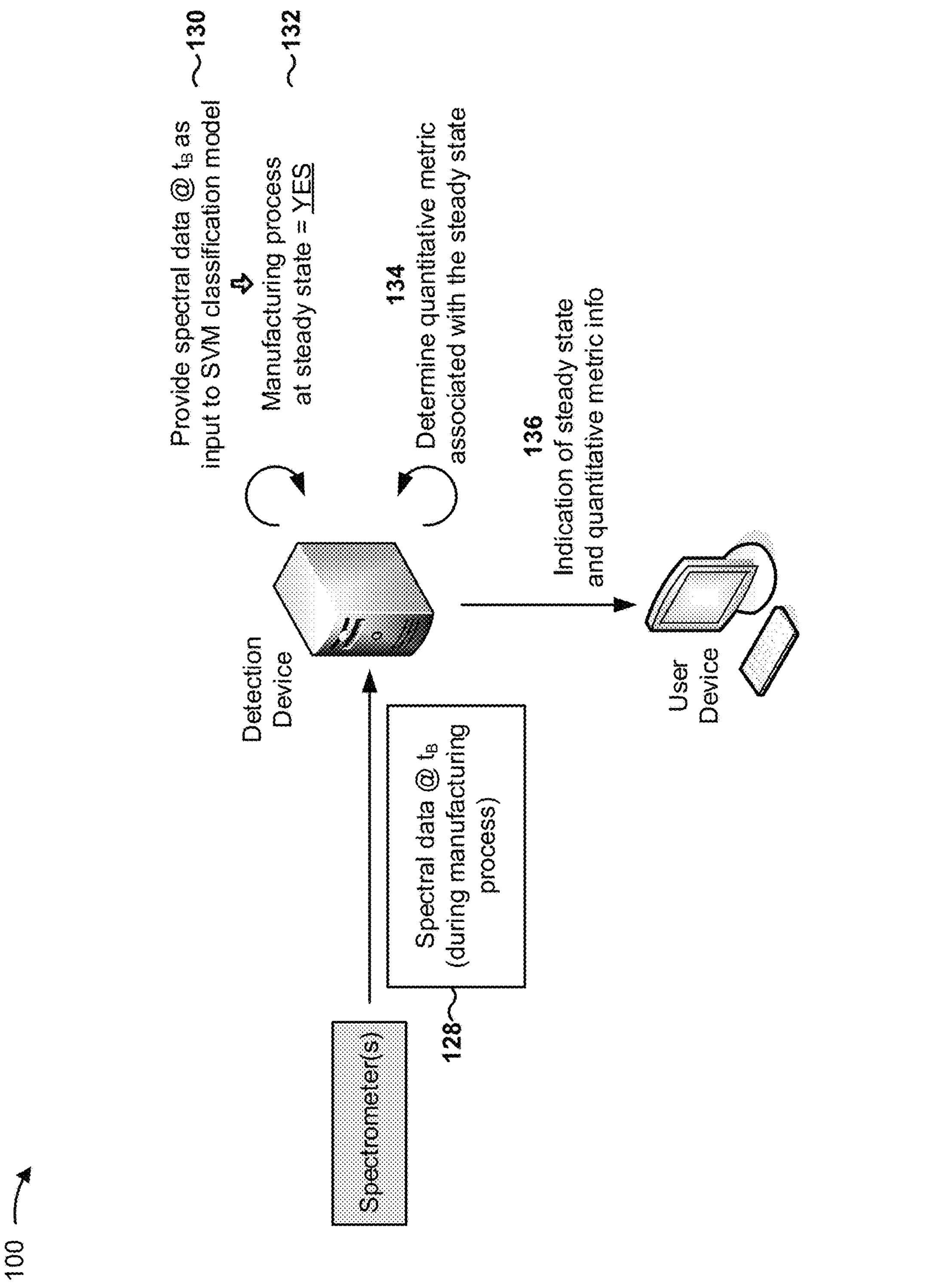

FIGS. 1A-1C are diagrams of an overview of an example implementation 100 described herein. As shown in FIG. 1A, and by reference number 102, a detection device may receive training spectral data associated with a manufacturing process. The training spectral data (sometimes referred to as first spectral data) may include spectral data, associated with the manufacturing process, based on which iterations of a support vector machine (SVM) classification model, associated with detecting whether the manufacturing process has reached a steady state, may be generated. For example, the training spectral data may include spectra (e.g., multivariate time series data, such as NIR spectra) measured by a spectrometer during a performance of the manufacturing process. The performance of the manufacturing process during which the training spectral data is gathered may be referred to as a first performance of the manufacturing process.

As shown, the training spectral data may include spectral data measured at a start time of the manufacturing process (time to), spectral data measured at a time at which the manufacturing process is known to be in an unsteady state (time $t_{us0}$), spectral data measured at a time at which the manufacturing process is known to be in a steady state (time $t_{ss0}$), spectral data measured at an end time of the manufacturing process (time $t_c$), and spectral data measured between time $t_0$ and time $t_e$ for which the state of the manufacturing process is unknown.

As shown by reference numbers 104 through 116, the detection device may generate iterations of the SVM classification model based on the training spectral data. For example, as shown by reference number 104, in order to generate an initial iteration (iteration 0) of the SVM classification model, the detection device may create, based on the training spectral data, an initial set of unsteady state data (e.g., including spectral data measured from time $t_0$ to time $t_{us0}$) and an initial set of steady state data (e.g., including spectral data measured from time $t_{ss0}$ to time $t_e$).

As shown by reference number 106, the detection device may generate, based on the initial set of unsteady state data and the initial set of steady state data, the initial iteration of the SVM classification model. As shown, based on providing the training spectral data as input to the initial iteration of the SVM classification model, the detection device may determine an initial predicted transition time ($t_{trans0}$) associated with the initial iteration of the SVM classification model (e.g., a time that the initial iteration of the SVM classification model predicts that manufacturing process transitioned from the unsteady state to the steady state).

As shown by reference number 108, in order to generate a first iteration (iteration 1) of the SVM classification model, the detection device may create, based on the training spectral data, a first set of unsteady state data (e.g., including spectral data measured from time $t_0$ to time $t_{trans0}$) and a first set of steady state data (e.g., including spectral data measured from time $t_{ss0\text{-}dt*1}$ to time $t_e$). Notably, the first set of unsteady state data includes spectral data measured until the transition time predicted by the initial iteration of the SVM classification model, while the first set of steady state data includes spectral data included in the initial set of steady state data, as well as spectral data measured one time step before time $t_{ss0}$.

As shown by reference number 110, the detection device may generate, based on the first set of unsteady state data and the first set of steady state data, the first iteration of the SVM classification model. As shown, based on providing the training spectral data as input to the first iteration of the SVM classification model, the detection device may determine a first predicted transition time ($t_{trans1}$) associated with the first iteration of the SVM classification model (e.g., a time that the first iteration of the SVM classification model predicted that manufacturing process transitioned from the unsteady state to the steady state).

In some implementations, the detection device may generate n (n>1) iterations of the SVM classification model and determine predicted transition times in this manner until an earliest time, associated with the set of steady state data used to generate the $n^{th}$ iteration of the SVM classification model, is a threshold amount of time (e.g., one time step) away from the time at which the manufacturing process is known to be in the unsteady state (e.g., until the set of steady state includes spectral data measured from $t_{ss0\text{-}dt*n}=t_{us0+dt}$ to time $t_e$).

For example, as shown in FIG. 1A by reference number 112, in order to generate an $n^{th}$ iteration (iteration n) of the SVM classification model, the detection device may create, based on the training spectral data, an $n^{th}$ set of unsteady state data (e.g., including spectral data measured from time $t_0$ to time $t_{trans(n\text{-}1)}$) and an $n^{th}$ set of steady state data (e.g., including spectral data measured from time $t_{ss0\text{-}dt*n}=t_{us0+dt}$ to time $t_e$). Notably, the $n^{th}$ set of unsteady state data includes spectral data measured until time the transition time predicted by the $(n-1)^{th}$ (i.e., previous) iteration of the SVM classification model, while the $n^{th}$ set of steady state data includes spectral data included in the $(n-1)^{th}$ set of steady state data, as well as spectral data measured one time step before time $t_{ss0\text{-}dt*(n\text{-}1)}$.

As shown by reference number 114, the detection device may generate, based on the $n^{th}$ set of unsteady state data and the $n^{th}$ set of steady state data, the $n^{th}$ iteration of the SVM classification model. As shown, based on providing the training spectral data as input to the $n^{th}$ iteration of the SVM classification model, the detection device may determine an $n^{th}$ predicted transition time ($t_{trans(n)}$) associated with the $n^{th}$ iteration of the SVM classification model (e.g., a time that the $n^{th}$ iteration of the SVM classification model predicted that the manufacturing process transitioned from the unsteady state to the steady state).

As shown by reference number 116, the detection device may determine, based on the n transition times predicted by the n iterations of the SVM classification model, a dominant (e.g., most predicted) transition time associated with the manufacturing process. As shown by reference number 118, the detection device may generate a final SVM classification model based on the transition time associated with the manufacturing process. For example, the detection device may create a final set of unsteady state data including spectral data measured before the determined dominant transition time, and a final set of steady state data including training spectral data measured at or after the determined dominant transition time. As shown, the detection device may generate the final SVM classification model based on the final set of unsteady state data and the final set of steady state data, accordingly.

As shown in FIG. 1B, and by reference number 120, the detection device may (at a later time) identify the SVM classification model (e.g., based on storing the final SVM classification model generated as described) for use in detecting whether a performance of the manufacturing process has reached the steady state. For example, the detection device may identify the SVM classification model based on receiving an indication that the manufacturing process is being started or has been started.

As shown by reference number 122, the detection device may receive, during the second performance of the manufacturing process, spectral data associated with the manufacturing process (sometimes referred to as second spectral data or additional spectral data). For example, as shown, a spectrometer may measure the spectral data at a given time (e.g., time $t_A$) during the performance of the manufacturing process, and may provide the spectral data to the detection device. The performance of the manufacturing process during which the spectral data is gathered for input to the SVM classification model may be referred to as a second performance of the manufacturing process.

As further shown, the detection device may determine, based on the spectral data and the SVM classification model, whether the manufacturing process is at the steady state at time $t_A$. For example, as shown by reference number 124, the detection device may provide the spectral data, measured at time $t_A$, as input to the SVM classification model. As shown by reference number 126, the detection device may determine, based on an output of the SVM classification model, that the manufacturing process is not at the steady state at time $t_A$. In some implementations, the detection device may determine whether the manufacturing process is at the steady state based on a decision boundary associated with the SVM classification model, as described below.

As shown in FIG. 1C, and by reference number 128, the detection device may receive, at a later time during performance of the manufacturing process (time $t_B$), spectral data associated with the manufacturing process. For example, as shown, a spectrometer may measure the spectral data at time $t_B$, and may provide the spectral data to the detection device.

As further shown, the detection device may determine, based on the spectral data and the SVM classification model, whether the manufacturing process is at the steady state at time $t_B$. For example, as shown by reference number 130, the detection device may provide the spectral data, measured at time $t_B$, as input to the SVM classification model. As shown by reference number 132, the detection device may determine, based on an output of the SVM classification model, that the manufacturing process is at the steady state at time $t_B$.

As shown by reference number 134, in some implementations, the detection device may (optionally) determine a quantitative metric, associated with the steady state, based on determining that the manufacturing process has reached the steady state. The quantitative metric may include a metric indicating a quantitative property associated with the steady state, such as a concentration of constituent parts of a compound at the steady state, a particle size at the steady state, and/or the like. For example, the detection device may store or have access to a regression model (e.g., a partial least square (PLS) regression model, a support vector regression (SVR) model) that receives, as input, the spectral data based on which the steady state was detected, and provide, as output, the quantitative metric associated with the steady state.

As shown by reference number 136, based on determining that the manufacturing process has reached the steady state, the detection device may provide (e.g., to a user device associated with monitoring the manufacturing process) an indication that the manufacturing process has reached the steady state. As further shown, the detection device may also provide information associated with the quantitative metric.

In this way, a detection device may generate a SVM classification model for determining whether a manufacturing process has reached a steady state, and determine, using the SVM classification model and based on multivariate spectral data associated with the manufacturing process, whether the manufacturing process has reached the steady state.

As indicated above, FIGS. 1A-1C are provided merely as an example. Other examples are possible and may differ from what was described with regard to FIGS. 1A-1C.

Figure 2:
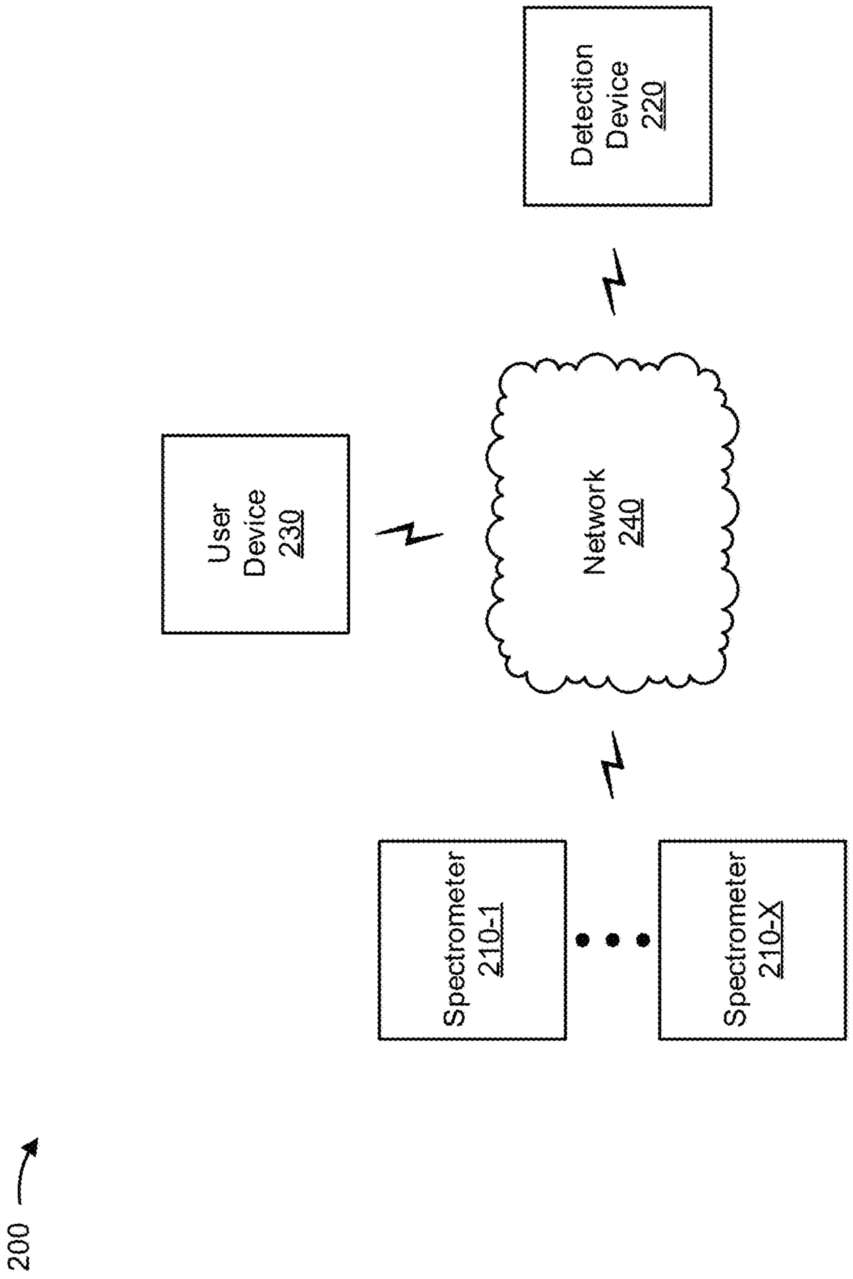
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more spectrometers 210-1 through 210-X ($X \geq 1$) (herein collectively referred to as spectrometers 210, and individually as spectrometer 210), a detection device 220, a user device 230, and a network 240. Devices of environment 200 may interconnect via wired connections, wireless connections, or a combination of wired and wireless connections.

Spectrometer 210 includes a device capable of performing a spectroscopic measurement on a sample (e.g., a sample associated with a manufacturing process). For example, spectrometer 210 may include a desktop (i.e., non-handheld) spectrometer device that performs spectroscopy (e.g., vibrational spectroscopy, such as near infrared (NIR) spectroscopy, mid-infrared spectroscopy (mid-IR), Raman spectroscopy, and/or the like). In some implementations, spectrometer 210 may be capable of providing spectral data, obtained by spectrometer 210, for analysis by another device, such as detection device 220.

Detection device 220 includes one or more devices capable of detecting whether a manufacturing process has reached a steady state based on a classification model, associated with the manufacturing process, and spectral data associated with the manufacturing process. For example, detection device 220 may include a server, a group of servers, a computer, a cloud computing device, and/or the like. In some implementations, detection device 220 may be capable of generating the classification model based on training spectral data associated with the manufacturing process. In some implementations, detection device 220 may receive information from and/or transmit information to another device in environment 200, such as spectrometer 210 and/or user device 230.

User device 230 includes one or more devices capable of receiving, processing, and/or providing information associated with whether a manufacturing process has reached a steady state. For example, user device 230 may include a communication and computing device, such as a desktop computer, a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device.

Network 240 includes one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
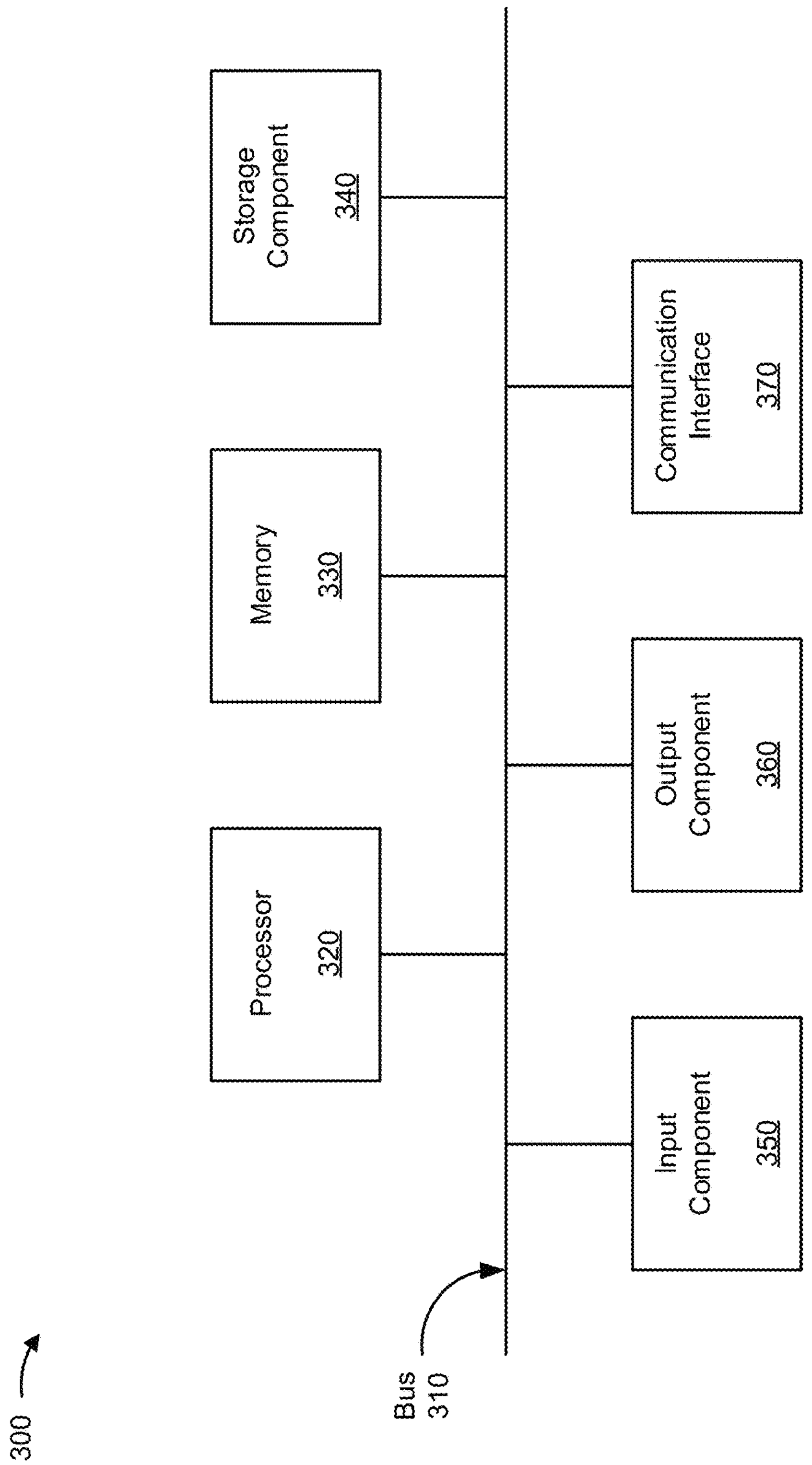
FIG. 3 is a diagram of example components of one or more devices of FIG. 2.

FIG. 3 is a diagram of example components of a device 300. Device 300 may correspond to spectrometer 210, detection device 220, and/or user device 230. In some implementations, spectrometer 210, detection device 220, and/or user device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
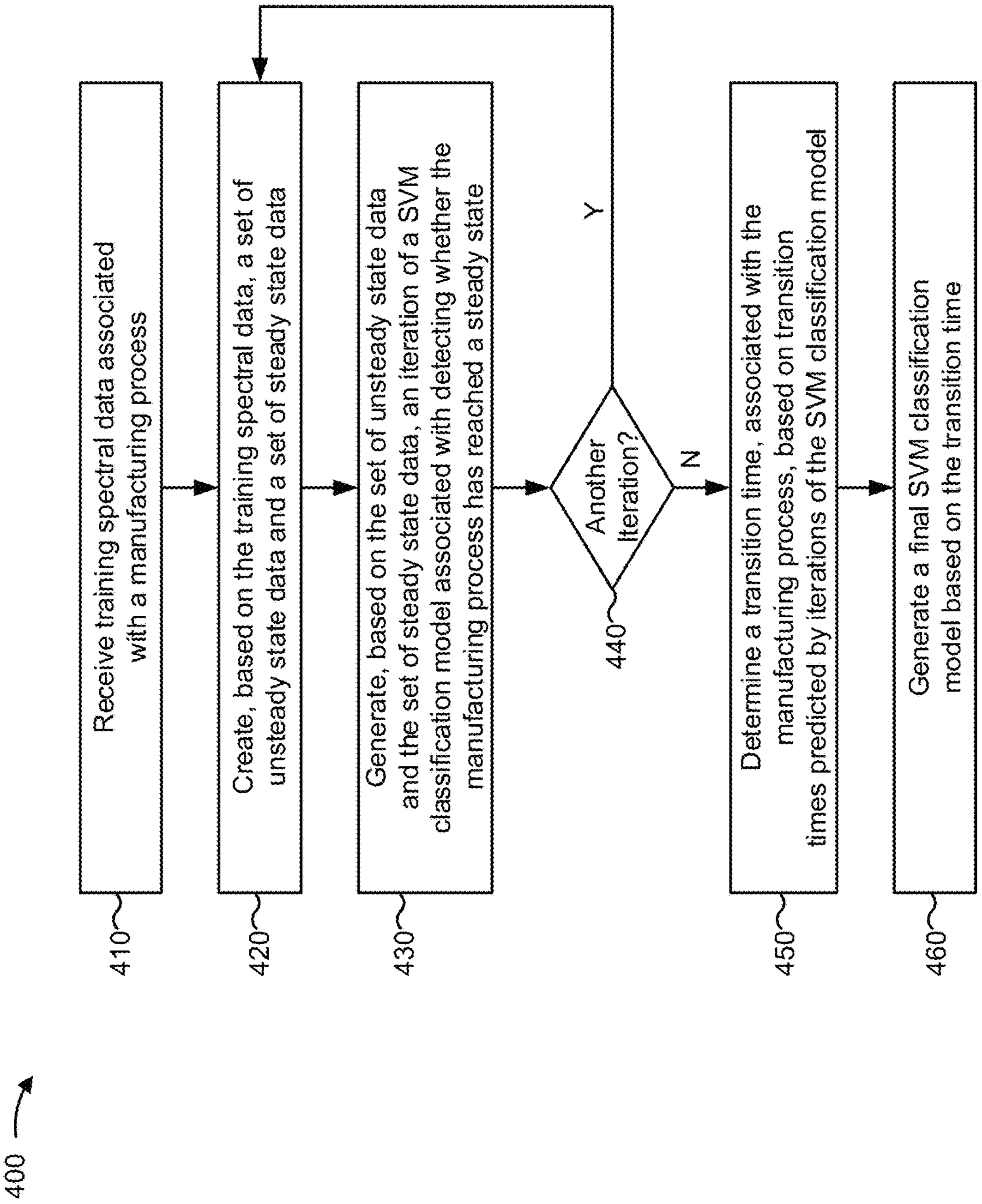
FIG. 4 is a flow chart of an example process for generating a SVM classification model for detecting when a manufacturing process has reached a steady state.

FIG. 4 is a flow chart of an example process 400 for generating a classification model for detecting when a manufacturing process has reached a steady state. In some implementations, one or more process blocks of FIG. 4 may be performed by detection device 220. In some implementations, one or more process blocks of FIG. 4 may be performed by another device or a group of devices separate from or including detection device 220, such as spectrometer 210 and/or user device 230.

As shown in FIG. 4, process 400 may include receiving training spectral data associated with a manufacturing process (block 410). For example, detection device 220 may receive training spectral data associated with a manufacturing process.

The training spectral data may include spectral data, associated with a manufacturing process, based on which iterations of a SVM classification model may be generated. For example, the training spectral data may include spectra (e.g., multivariate time series data, such as NIR spectra) measured by spectrometer 210 during a performance of the manufacturing process. In some implementations, the manufacturing process may be a continuous manufacturing process or a batch manufacturing process. In some implementations, detection device 220 may generate the iterations of the SVM classification model based on the training spectral data, as described below.

In some implementations, the training spectral data may include historical spectra measured at different times (e.g., periodically at a series of time steps) during an earlier performance of the manufacturing process. For example, the training spectral data may include spectra measured at a start time of the earlier performance of the manufacturing process (herein referred to as time to) and spectra measured at an end time of the earlier performance of the manufacturing process (herein referred to as time $t_e$).

As another example, the training spectral data may include spectra measured at a time at which the earlier performance of the manufacturing process is known to have been at an unsteady state (herein referred to as time $t_{us0}$). In some implementations, time $t_{us0}$ may be the same time as time to (e.g., since the manufacturing process is in the unsteady state at the start of the manufacturing process). Alternatively, time $t_{us0}$ may be a time that is after time $t_0$, such as a time that is one time step after time $t_0$, five time steps after time $t_0$, 40 time steps after time $t_0$, and/or the like. In some implementations, time $t_{us0}$ may be a time, after time $t_0$, at which the earlier performance of the manufacturing process is assumed to have been at the unsteady state.

As an additional example, the training spectral data may include spectra measured at a time at which the earlier performance of the manufacturing process is known to have been at a steady state (herein referred to as time $t_{ss0}$). In some implementations, time $t_{ss0}$ may be the same time as time $t_e$ (e.g., since the manufacturing process is in the steady state at the end of the manufacturing process). Alternatively, time $t_{ss0}$ may be a time that is before time $t_e$, such as a time that is one time step before time $t_e$, five time steps before time $t_e$, 40 time steps before time the, and/or the like. In some implementations, time $t_{ss0}$ may be a time, before time $t_e$, at which the earlier performance of the manufacturing process is assumed to have been at the steady state.

As yet another example, the training spectral data may include spectra, measured at times between time to and time $t_e$, for which the state of the earlier performance of the manufacturing process is unknown.

In some implementations, detection device 220 may receive the training spectral data from one or more other devices, such as one or more spectrometers 210 that obtain the training spectral data during the earlier performance of the manufacturing process or a server device that stores training spectral data measured by one or more spectrometers 210 during the earlier performance of the manufacturing process.

In some implementations, the training spectral data may be associated with multiple earlier performances of the manufacturing process, where starting conditions (e.g., total weight, particle size, distribution, moisture level, etc.) vary among the multiple performances of the manufacturing process. In such a case, multiple sets of training spectral data, associated with the multiple performances of the manufacturing process, may be averaged and/or otherwise combined in order to form the training spectral data. In some implementations, measuring the training spectral data with varying starting conditions results in increased accuracy and/or robustness of a SVM classification model generated based on the training spectral data (e.g., as compared to a SVM classification model generated based on a performance of the manufacturing process with single set of starting conditions).

In some implementations, detection device 220 may perform dimension reduction on the training spectral data. Dimension reduction may include reducing a number of variables, of the multivariate training spectral data, based on which a SVM classification model may be generated. In some implementations, dimension reduction may be performed using a principal component analysis (PCA) technique, whereby principal components (i.e., a subset of the multiple variables) is identified for use in generating the SVM classification model. Additionally, or alternatively, dimension reduction may be performed using a variable selection technique, whereby variables, of the multiple variables, are selected that are discriminative of, for example, a compound associated with the manufacturing process. Examples of such variable selection techniques include a selectivity ratio (SR) technique, a variable importance in projection (VIP) technique, and/or the like. In some implementations, performing dimension reduction may result in improved interpretability of the SVM classification model and/or improved generation of the SVM classification model by, for example, removing interference and/or reducing noise among the multiple variables (e.g., as compared to a SVM classification model generated on the entire set of training spectral data).

As further shown in FIG. 4, process 400 may include creating, based on the training spectral data, a set of unsteady state data and a set of steady state data (block 420). For example, detection device 220 may create, based on the training spectral data, a set of unsteady state data and a set of steady state data.

The set of unsteady state data may include spectral data, included in the training spectral data, that corresponds to times at which the manufacturing process is assumed to be in the unsteady state for purposes of generating an iteration of a SVM classification model. For example, an initial set of unsteady state data, associated with generating an initial iteration of the SVM classification model, may include spectral data measured at times from time $t_0$ to time $t_{us0}$. Continuing with this example, another set of unsteady state data, associated with generating a next iteration of the SVM model, may include spectral data measured at times from time $t_0$ to time $t_{trans0}$, where time $t_{trans0}$ is a transition time (e.g., a time of a transition from the unsteady state to the steady state) as predicted by the initial iteration of the SVM classification model. In general, an $n^{th}$ set of unsteady state data, associated with generating an $n^{th}$ iteration of the SVM model, may include spectral data measured at times from time $t_0$ to time $t_{trans(n-1)}$, where time $t_{trans(n-1)}$ is a transition time as determined by the $(n-1)^{th}$ (i.e., previous) iteration of the SVM classification model. Additional details regarding generating the iterations of the SVM classification model are described below.

In some implementations, the set of unsteady state data may be updated, modified, and/or recreated for generating each iteration of the SVM model by, for example, adding additional spectral data, included in the training spectral data, to a set of unsteady state data associated with generating a previous iteration of the SVM model. For example, an $n^{th}$ set of unsteady state data, for generating an $n^{th}$ iteration of the SVM classification model, may include spectral data included in an $(n-1)^{th}$ set of unsteady state data, used to generate an $(n-1)^{th}$ iteration of the SVM classification model, as well as spectral data measured at times from a last time in the $(n-1)^{th}$ set of unsteady state data to a transition time predicted using the $(n-1)^{th}$ iteration of the SVM classification model. As a particular example, a set of steady state data for generating a fourth iteration of the SVM classification model may include spectral data measured from time to to time $t_{trans3}$ (e.g., from the start time to a transition time determined using the third iteration of the model), whereas a set of steady state data for generating a fifth (i.e., next) iteration of the SVM classification model may include spectral data measured from time $t_0$ to time $t_{trans4}$ (e.g., from the start time to a transition time as determined using the fourth iteration of the SVM classification model).

The set of steady state data may include spectral data, included in the training spectral data, that corresponds to times at which the earlier performance of the manufacturing process is assumed to be in the steady state for purposes of generating an iteration of the SVM classification model. For example, an initial set of steady state data, associated with generating an initial iteration of the SVM classification model, may include spectral data measured at times from time $t_{ss0}$ to time $t_e$. Continuing with this example, another set of steady state data, associated with generating a next iteration of the SVM model, may include spectral data measured at times from time $t_{ss0\text{-}dt*1}$ to time $t_e$, where time $t_{ss0\text{-}dt*1}$ is a time that is one time step before time $t_{ss0}$. In other words, detection device 220 may iteratively add spectral data, associated with time steps before time $t_{ss0}$, to each set of steady state data when generating each iteration of the SVM classification model. In general, an $n^{th}$ set of steady state data, associated with generating an $n^{th}$ iteration of the SVM model, may include spectral data measured at times from time $t_{ss0\text{-}dt*n}$ to time $t_e$, where time $t_{ss0\text{-}dt*n}$ is a time that is n time steps before time $t_{ss0}$.

In some implementations, the set of steady state data may be updated, modified, and/or recreated for generating each iteration of the SVM model by, for example, adding additional spectral data to a set of steady state data associated with generating a previous iteration of the SVM model. For example, a set of steady state data for generating a given iteration of the SVM classification model may include spectral data included in a set of steady state data used to generate a previous iteration of the SVM classification model, as well as spectral data measured at a time step immediately preceding an earliest time step associated with the set of spectral data for generating the previous iteration of the SVM classification model. As a particular example, a set of steady state data for generating a fourth iteration of the SVM classification model may include spectral data measured from time $t_{ss0\text{-}dt*4}$ to time $t_e$, whereas a set of steady state data for generating a fifth (i.e., next) iteration of the SVM classification model may include spectral data measured from time $t_{ss0\text{-}dt*5}$ to time $t_e$ (i.e., spectral data for one time step earlier than $t_{ss0\text{-}dt*4}$).

As further shown in FIG. 4, process 400 may include generating, based on the set of unsteady state data and the set of steady state data, an iteration of a SVM classification model associated with detecting whether the manufacturing process has reached a steady state (block 430). For example, detection device 220 may generate, based on the set of unsteady state data and the set of steady state data, an iteration of a SVM classification model associated with detecting when the manufacturing process has reached a steady state.

In some implementations, detection device 220 may generate the iteration of the SVM classification model based on applying a SVM technique to the set of unsteady state data and the set of steady state data. For example, detection device 220 may generate the SVM classification model by mapping the set of unsteady state data and the set of steady state data as points in space such that the set of unsteady state data is separated from the set of steady state data by, for example, a set of hyperplanes.

In some implementations, detection device 220 may determine, based on the training spectral data and the iteration of the SVM classification model, a predicted transition time associated with (i.e., predicted by) the iteration of the SVM classification model. For example, detection device 220 may generate the iteration of the SVM classification model based on the set of steady state data and the set of unsteady state data. Here, detection device 220 may map the training spectral data (e.g., associated with each time step from time $t_0$ to time $t_e$) into the same space based on which the iteration of the SVM classification model was generated. In this example, based on where items of training spectral data are mapped (e.g., with respect to the set of hyperplanes), the SVM classification model may identify a transition time ($t_{trans(n)}$), associated with the manufacturing process, predicted by the initial iteration of the SVM classification model. In some implementations, detection device 220 may determine a predicted transition time for each iteration of the SVM classification model. In some implementations, detection device 220 may store information that identifies predicted transition times associated with the iterations of the SVM classification model in order to allow detection device 220 to determine a transition time associated with the manufacturing process, as described below.

As further shown in FIG. 4, process 400 may include determining whether to generate another iteration of the SVM classification model (block 440). For example, detection device 220 may determine whether to generate another iteration of the SVM classification model.

In some implementations, detection device 220 may determine whether to generate another iteration of the SVM classification model based on a time associated with the set of steady state data. For example, detection device 220 may be configured to continue generating iterations of the SVM classification model until an earliest time, of the times associated with the set of steady state data, satisfies a threshold time associated with the time at which the manufacturing process is known to be at the unsteady state (time $t_{us0}$). As a particular example, detection device 220 may be configured to continue generating iterations of the SVM classification model (and determining predicted transition times) until an earliest time, associated with the set of steady state data, differs from time $t_{us0}$ by a threshold amount (e.g., until $t_{ss0\text{-}dt*n}$ is one time step from $t_{us0}$ ($t_{ss0\text{-}dt*n}=t_{us0+dt}$)).

Additionally, or alternatively, detection device 220 may determine whether to generate another iteration of the SVM classification model based on an iteration threshold. For example, detection device 220 may be configured to continue generating iterations of the SVM classification model for a threshold amount of time, until a threshold number of iterations have been generated, and/or the like. Here, detection device 220 may determine whether to generate another iteration of the SVM classification model based on whether the threshold is satisfied (e.g., whether the threshold amount of time has lapsed, whether the threshold number of iterations have been generated, and/or the like).

As further shown in FIG. 4, if another iteration of the SVM classification model is to be generated (block 440—YES), then process 400 may include creating, based on the training spectral data, another set of steady state data and another set of unsteady state data (block 420). For example, detection device 220 may determine that another iteration of the SVM classification model is to be generated (e.g., when $t_{ss0\text{-}dt*n}>t_{us0+dt}$, when the iteration threshold is not satisfied, and/or the like) and detection device 220 may create, based on the training spectral data, another set of steady state data and another set of unsteady state data.

In some implementations, detection device 220 may create the other set of unsteady state data and the other set of steady state data in the manner described above with regard to block 420. In some implementations, upon creating the other set of steady state data and the other set of unsteady state data, detection device 220 may generate the other iteration of the SVM classification model and determine a transition time, predicted by the other iteration of the SVM classification model, as described above with regard to block 430.

As an example of the above described iterative process, detection device 220 may create an initial set of unsteady state data (e.g., including training spectral data measured at times from time $t_0$ to time $t_{us0}$) and an initial set of steady state data (e.g., including training spectral data measured at times from time $t_{ss0}$ to time $t_e$). In this example, detection device 220 may apply the SVM technique to the initial set of steady state data and the initial set of unsteady state data in order to generate an initial iteration of the SVM classification model. Next, detection device 220 may provide the training spectral data as input to the initial iteration of the SVM classification model and determine, as an output, an initial predicted transition time ($t_{trans0}$) associated with the initial iteration of the SVM classification model.

Continuing with this example, detection device 220 may determine that $t_{ss0}>t_{us0+dt}$ and, thus, that detection device 220 may generate another iteration of the SVM classification model. Detection device 220 may then create, based on the training spectral data and the initial predicted transition time, a first set of steady state data (e.g., including training spectral data measured from time $t_{ss0\text{-}dt*1}$ to time $t_e$) and a first set of unsteady state data (e.g., including training spectral data measured at times from time $t_0$ to time $t_{trans0}$). Detection device 220 may then apply the SVM technique to the first set of steady state data and the first set of unsteady state data in order to generate a first iteration of the SVM classification model. Next, detection device 220 may provide the training spectral data as input to the first iteration of the SVM classification model, and determine, as an output, a first predicted transition time ($t_{trans1}$) associated with the first iteration of the SVM classification model. Detection device 220 may continue generating iterations of the SVM classification model (and determining predicted transition times) in this manner, until detection device 220 determines that no additional iterations are to be generated.

As further shown in FIG. 4, if another iteration of the SVM classification model is not to be generated (block 440—NO), then process 400 may include determining a transition time, associated with the manufacturing process, based on transition times predicted by iterations of the SVM classification model (block 450). For example, detection device 220 may determine that another iteration of the SVM classification model is not be generated, and detection device 220 may determine a transition time, associated with the manufacturing process, based on transition times predicted by iterations of the SVM classification model.

In some implementations, detection device 220 may determine the transition time, associated with the manufacturing process, based on predicted transition times associated with the iterations of the SVM classification model. For example, detection device 220 may determine n transition times, predicted by n iterations of the SVM classification model, respectively, in the manner described above. Here, detection device 220 may determine the transition time, associated with the manufacturing process, as a dominant transition time (e.g., a predicted transition time with the most occurrences) of those predicted by the n iterations of the SVM classification model.

Figure 5A:
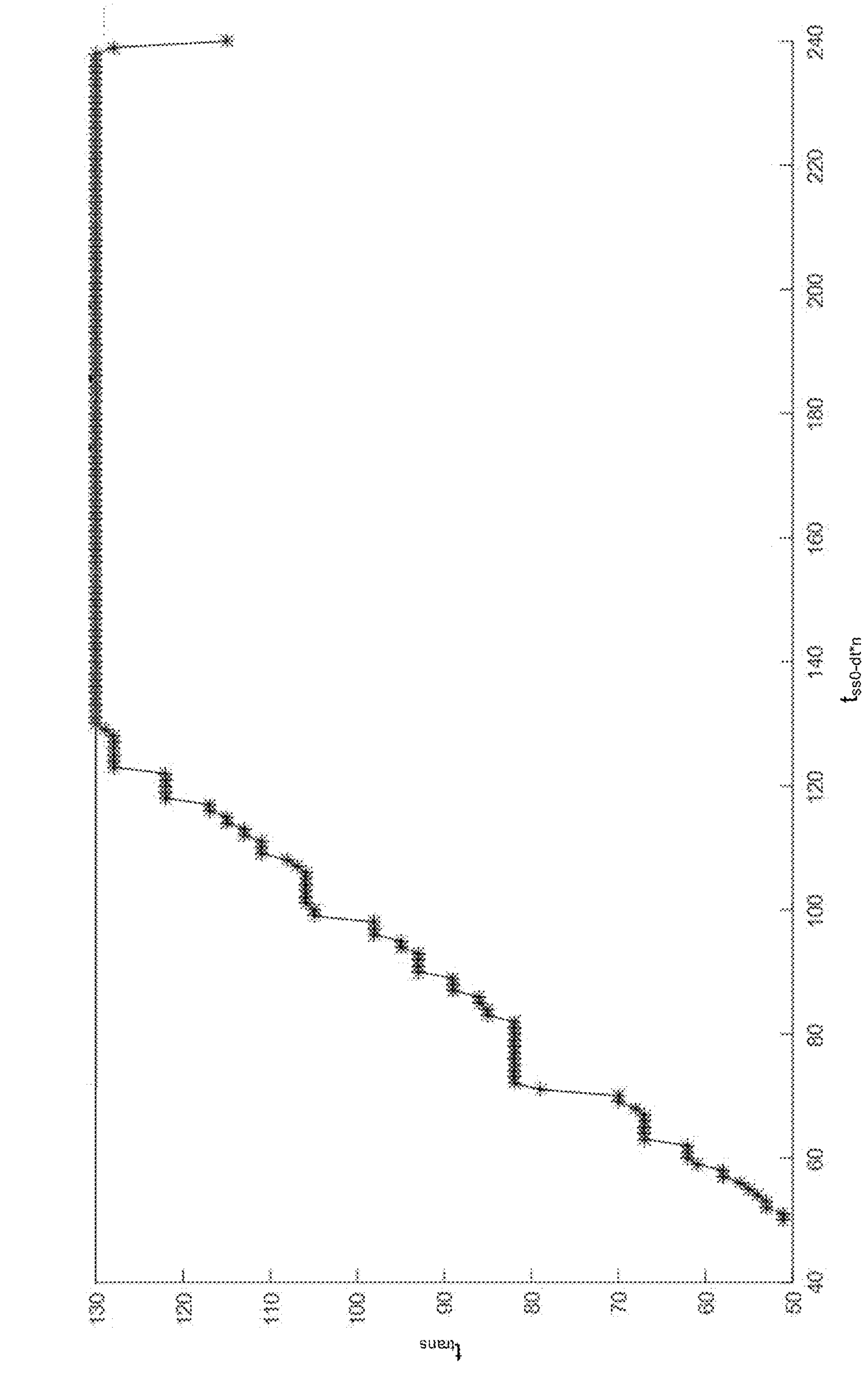
FIGS. 5A and 5B are example graphical representations associated with determining a transition time of a manufacturing process based on transition times predicted by iterations of a SVM classification model associated with the manufacturing process.
Figure 5B:
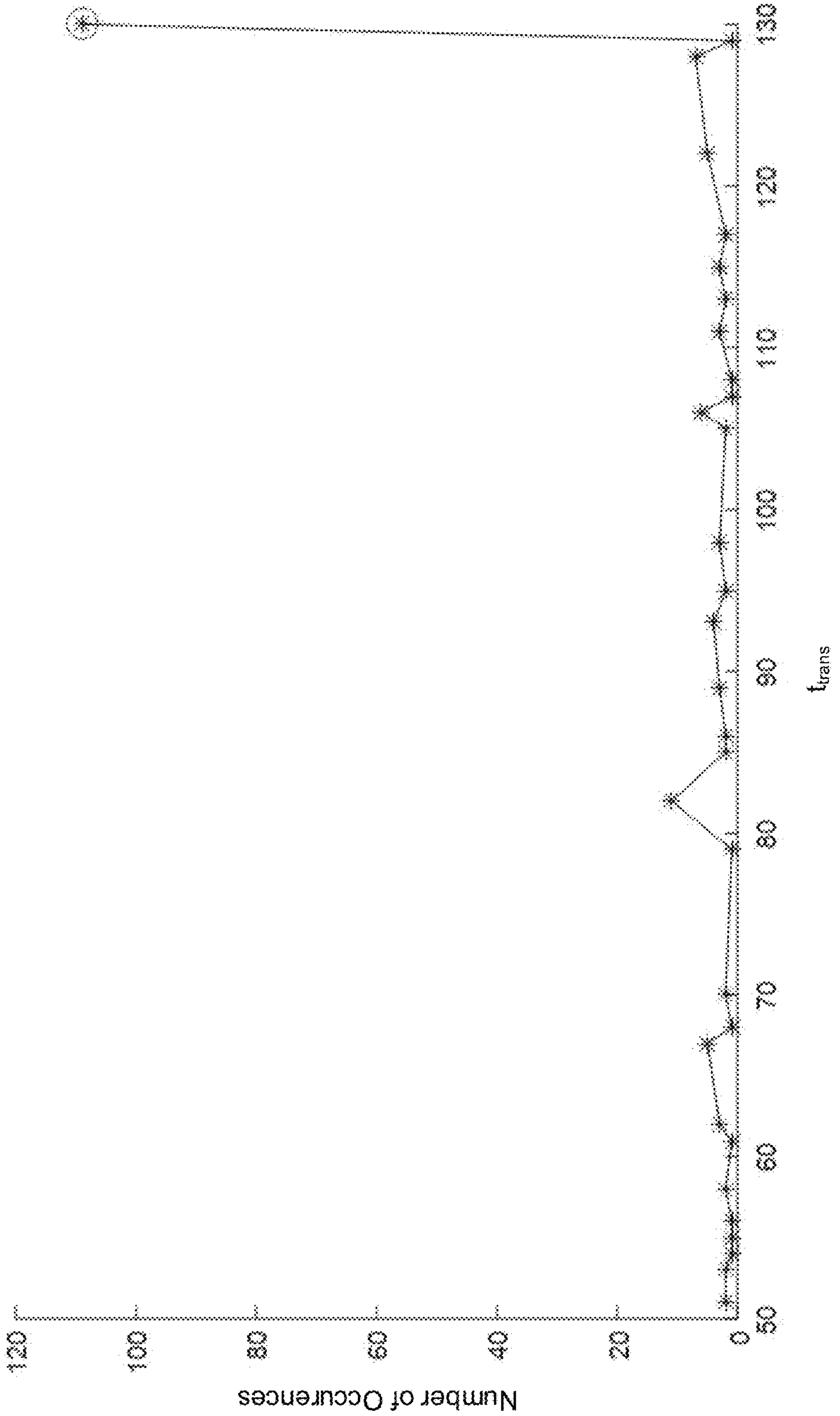

FIGS. 5A and 5B are example graphical representations 500 and 550 associated with determining a transition time of a manufacturing process based on transition times predicted by iterations of a SVM classification model associated with the manufacturing process. For the purposes of FIGS. 5A and 5B, assume that detection device 220 has determined n transition times corresponding to n iterations of a SVM classification model.

In FIG. 5A, each point represents a transition time, predicted by an iteration of the SVM classification model, plotted relative to a time $t_{ss0\text{-}dt*n}$ associated with the iteration of the SVM classification model (i.e., time $t_{ss0\text{-}dt*n}$ associated with a set of steady state associated with generating the iteration of the SVM classification model). As shown in FIG. 5A, a dominant transition time, of the set of n transition times, is at time 130 (e.g., time 130 was predicted by more iterations than any other transition time). In this example, detection device 220 may determine the transition time, associated with the manufacturing process, as time 130.

An alternative graphical representation is shown in FIG. 5B. In FIG. 5B, a total number of occurrences of each transition time is plotted. Again, as shown in FIG. 5B, a dominant transition time, of the set of n transition times, is at time 130. Thus, detection device 220 may determine the transition time, associated with the manufacturing process, as time 130.

As indicated above, FIGS. 5A and 5B are provided merely as an example. Other examples are possible and may differ from what was described with regard to FIGS. 5A and 5B.

Returning to FIG. 4, process 400 may include generating a final SVM classification model based on the transition time associated with the manufacturing process (block 460). For example, detection device 220 may generate a final SVM classification model based on the transition time associated with the manufacturing process.

The final SVM classification model may include a SVM classification model generated based on the transition time, associated with the manufacturing process, determined based on the iterations of the SVM classification model.

In some implementations, detection device 220 may generate the final classification model based on the transition time associated with the manufacturing process. For example, detection device 220 may determine the transition time associated with the manufacturing process, as described above. Here, detection device 220 may create a final set of unsteady state data, including training spectral data associated with times before the transition time, and a set of final steady state data including training spectral data associated with times at or after the transition time. In this example, detection device 220 may apply the SVM technique to the final set of unsteady state data and the final set of steady state data, and may generate the finalized SVM classification model in a manner similar to that described above.

In some implementations, as described above, the SVM classification model may include a decision boundary (e.g., a hyperplane) that may serve as a basis for determining whether a later performance of the manufacturing process has reached the steady state. Additional details regarding the decision boundary are described below with regard to FIG. 6.

In some implementations, detection device 220 may store the final SVM classification model such that detection device 220 may use the final SVM classification model in order to determine whether a later performance of the manufacturing process is at the unsteady state or the steady state, as described below. In this way, detection device 220 may generate a SVM classification model that can receive, as input, spectral data associated with the manufacturing process and provide, as an output, an indication of whether the manufacturing process is at the unsteady state or the steady state.

In some implementations, a manufacturing process may include multiple state transitions, and detection device 220 may repeat process 400 for each steady state in order to determine multiple SVM classification models associated with the manufacturing process. For example, a manufacturing process may transition from a first unsteady state to a first steady state, from the first steady state to a second unsteady state, and from the second unsteady state to a second steady state. In this example, detection device 220 may perform process 400 (e.g., based on training spectral data measured associated with the manufacturing process) in order to generate a SVM classification model associated with a transition time to the second steady state. Next, detection device 220 may perform process 400 (e.g., based on a subset of the training spectral data that does not include training spectral data associated with the second steady state) in order to generate a SVM classification model associated with a transition time to the first steady state.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 6:
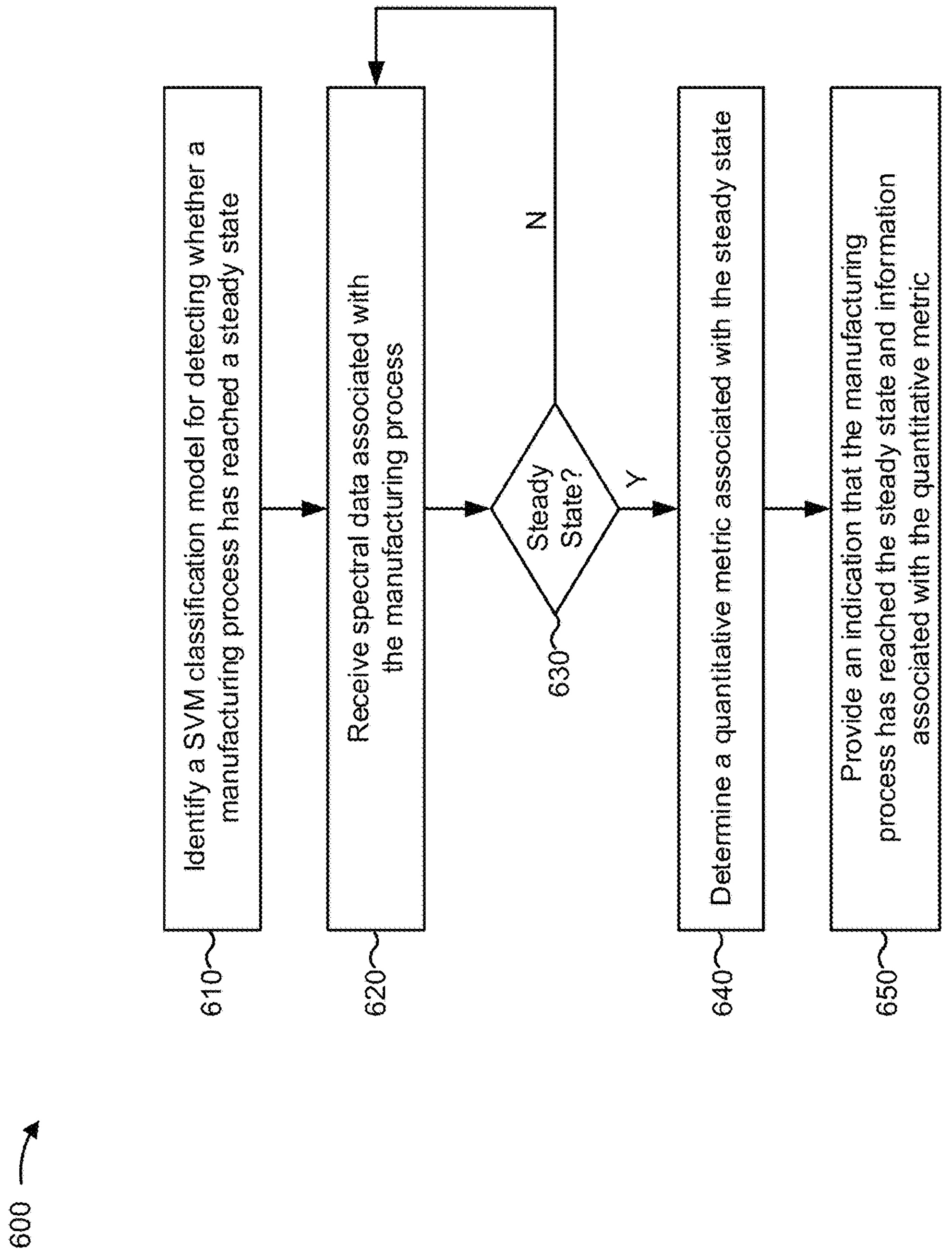
FIG. 6 is a flow chart of an example process for determining, based on spectral data and using a SVM classification model, whether a manufacturing process has reached a steady state.

FIG. 6 is a flow chart of an example process 600 for determining, based on spectral data and using a SVM classification model, whether a manufacturing process has reached a steady state. In some implementations, one or more process blocks of FIG. 6 may be performed by detection device 220. In some implementations, one or more process blocks of FIG. 6 may be performed by another device or a group of devices separate from or including detection device 220, such as spectrometer 210 and/or user device 230.

As shown in FIG. 6, process 600 may include identifying a SVM classification model for detecting whether a manufacturing process has reached a steady state (block 610). For example, detection device 220 may identify a SVM classification model for detecting whether a manufacturing process has reached a steady state.

In some implementations, detection device 220 may identify the SVM classification model based on information stored or accessible by detection device 220. For example, detection device 220 may identify the SVM classification model based on storing a final SVM classification model, generated by detection device 220, as described above with regard to process 400.

In some implementations, detection device 220 may identify the SVM classification model when detection device 220 receives (e.g., from spectrometer 210, user device 230, based on user input, and/or the like) an indication that detection device 220 is to monitor the manufacturing process in order to determine when the manufacturing process has reached a steady state. For example, detection device 220 may receive, from spectrometer 210 and/or user device 230, an indication that a particular manufacturing process is to be started or has been started, and may (e.g., automatically) identify the SVM classification model based on receiving the indication when, for example, detection device 220 is configured to automatically monitor the manufacturing process in order to detect when the manufacturing process has reached a steady state.

As further shown in FIG. 6, process 600 may include receiving spectral data associated with the manufacturing process (block 620). For example, detection device 220 may receive spectral data associated with the manufacturing process.

In some implementations, the spectral data may include spectra measured by one or more spectrometers 210 during a performance of the manufacturing process. In some implementations, detection device 220 may receive the spectral data in real-time or near real-time during the manufacturing process. For example, detection device 220 may receive spectral data, measured by spectrometer 210 during the performance of the manufacturing process, in real-time or near real-time relative to spectrometer 210 obtaining the spectral data. In some implementations, detection device 220 may determine, based on the spectral data and the SVM classification model, whether the manufacturing process has reached the steady state, as described below.

As further shown in FIG. 6, process 600 may include determining, based on the spectral data and the SVM classification model, whether the manufacturing process has reached the steady state (block 630). For example, detection device 220 may determine, based on the spectral data and the SVM classification model, whether the manufacturing process has reached the steady state.

In some implementations, detection device 220 may determine whether the manufacturing process has reached the steady state based on a decision boundary associated with the SVM classification model. For example, based on identifying the transition time of the manufacturing process using the training spectral data (as described above), detection device 220 may generate the SVM classification model including a decision boundary represented by a hyperplane in spectroscopic space. Here, points in the spectroscopic space that are inside the decision boundary represent spectroscopic conditions at which the manufacturing process is at the steady state, while points outside of the decision boundary represent spectroscopic conditions at which the manufacturing process is at the unsteady state. In some implementations, the decision boundary may be generated based on applying the SVM classification model technique to the training spectral data after determining the transition time associated with the manufacturing process, as described above.

Figure 7A:
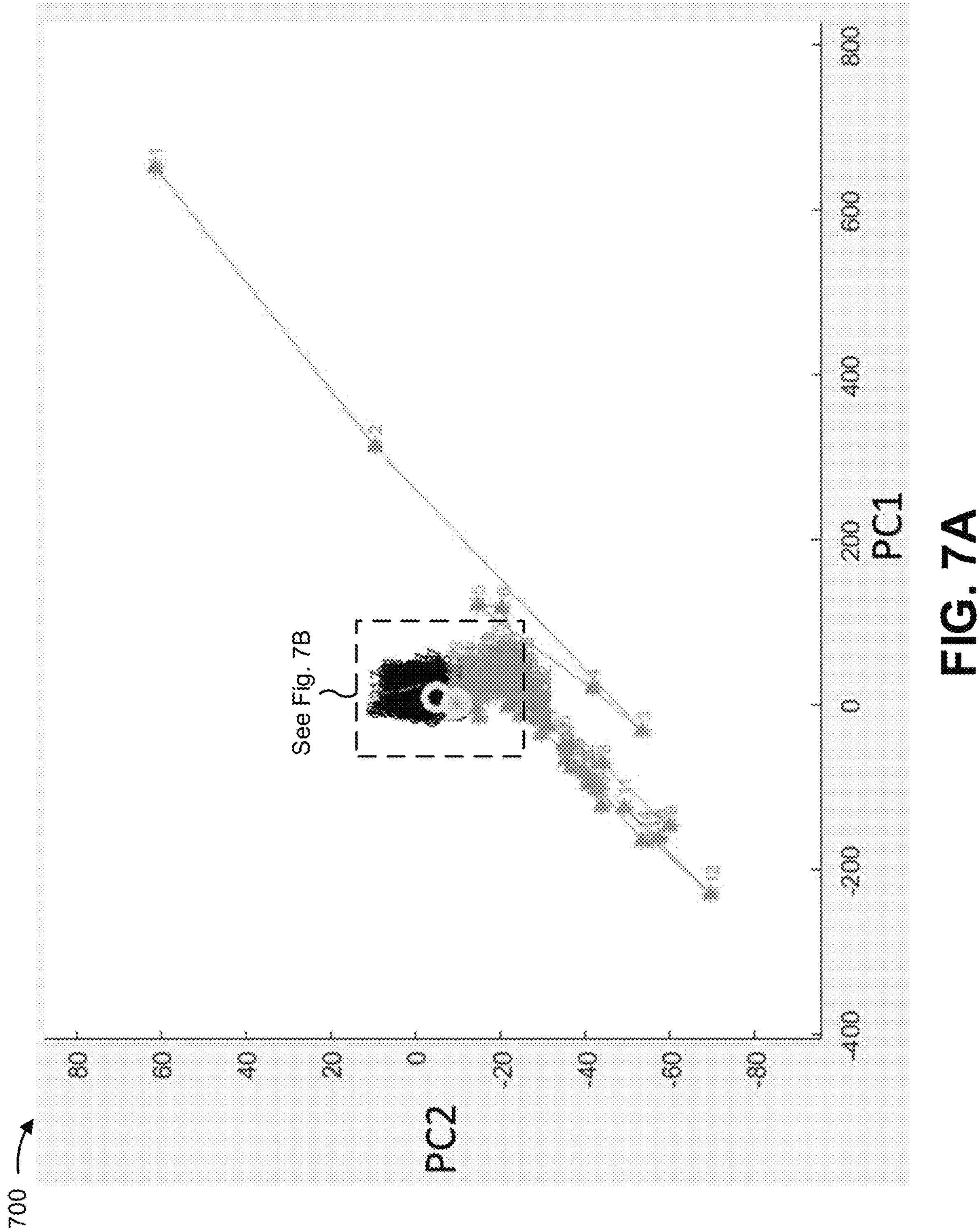
FIGS. 7A and 7B are example graphical representations illustrating a simplified decision boundary associated with the SVM classification model.
Figure 7B:
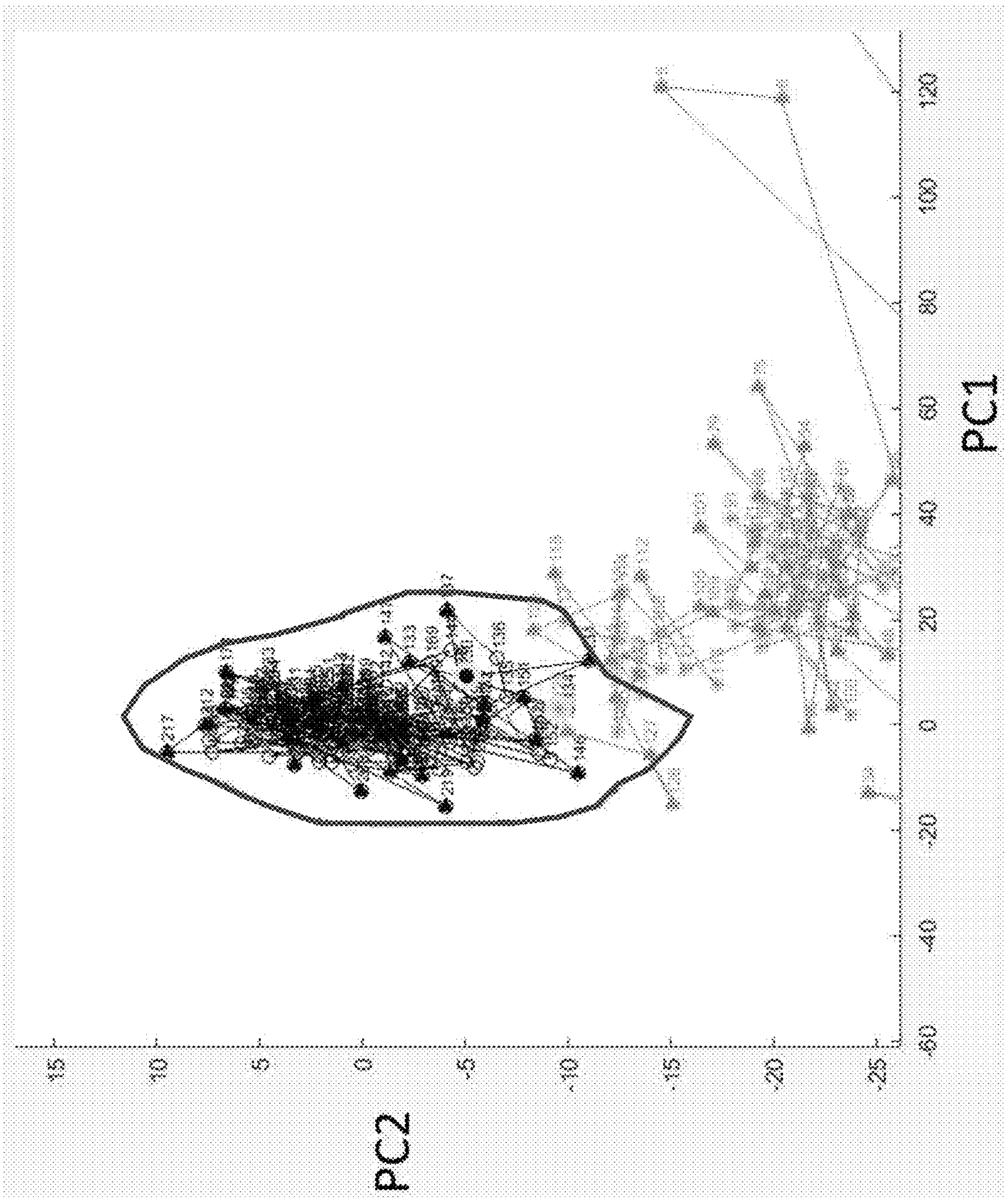

FIGS. 7A and 7B are example graphical representations 700 illustrating a simplified decision boundary associated with the SVM classification model. For illustrative purposes, the decision boundary shown in FIGS. 7A and 7B is shown as being associated with a first principal component (PC1) and a second principal component (PC2) only. In practice, the decision boundary may be associated with a different number of components (e.g., 80 variables, 120 variables, and/or the like).

In FIGS. 7A and 7B, the gray points and lines represent training spectral data measured at times at which the manufacturing process is in the unsteady state (i.e., from $t_0$ to the transition time associated with the SVM classification model), while the black points and lines represent training spectral data measured at times at which the manufacturing process is in the steady state (i.e., from the transition time associated with the SVM classification model to time the). The light gray circles represent the last point at which the manufacturing process was in the unsteady state and the first at which the manufacturing process was in the steady state. FIG. 7A is graphical representation of all training spectral data associated with the manufacturing process (e.g., from time $t_0$ to time $t_e$), while FIG. 7B is a close-up view of points within the space indicated by the dashed rectangle in FIG. 7A. In FIG. 7B, the decision boundary is represented by the thick line surrounding the points associated with the steady state (as well as a subset of the points associated with the unsteady state). As indicated above, FIGS. 7A and 7B are provided merely as simplified illustrative examples. Other examples are possible and may differ from what was described with regard to FIGS. 7A and 7B.

In some implementations, detection device 220 may determine whether the manufacturing process has reached the steady state based on the decision boundary (e.g., a decision boundary such as that shown in FIG. 7B). For example, detection device 220 may receive spectral data associated with the manufacturing process, and may map the spectral data as a point in the space associated with the decision boundary. Here, if the point, associated with the spectral data, is on or within the decision boundary, then detection device 220 may determine that the manufacturing process has reached the steady state. Alternatively, if the point, associated with the spectral data, is outside of the decision boundary, then detection device 220 may determine that the manufacturing process has not reached the steady state (i.e., is at the unsteady state).

In some implementations, detection device 220 may generate a confidence metric (herein referred to as a decision value) associated with the determination of whether the manufacturing process has reached the steady state. For example, detection device 220 may determine, based on the decision boundary and the point representing the spectral data, a distance from the decision boundary to the point representing the spectral data (e.g., a distance to a closest point on the decision boundary). Here, points inside the decision boundary may be assigned positive (or negative) decision values, while points outside of the decision boundary may be assigned negative (or positive) decision values. In this example, decision values with higher absolute values (e.g., 4.0, 2.5, −2.5, −4.0, and/or the like) represent a higher confidence in a determination of the state of the manufacturing process than those with lower absolute values (e.g., 0.5, 0.2, −0.2, −0.5, and/or the like).

As indicated above, FIGS. 7A and 7B are provided merely as illustrative examples. Other examples are possible and may differ from what was described with regard to FIGS. 7A and 7B.

Figure 8:
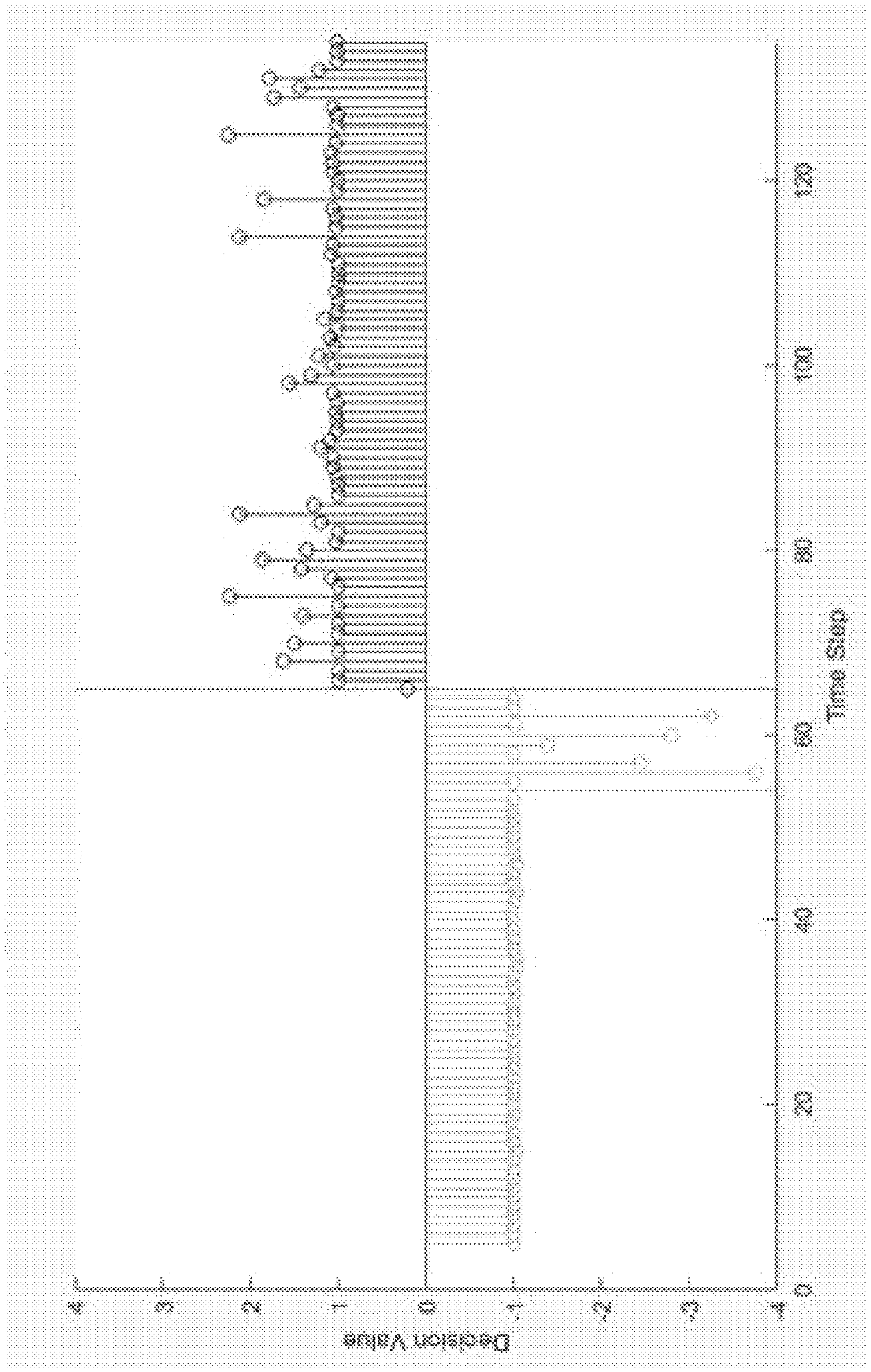
FIG. 8 is a graphical representation of example decision values determined based on the decision boundary of FIGS. 7A and 7B.

FIG. 8 is a graphical representation 800 of example decision values determined based on the decision boundary of FIGS. 7A and 7B. In FIG. 8, negative decision values correspond to spectral data, measured during a manufacturing process, with points that fall outside of the decision boundary, while positive decision values correspond to spectral data, measured during the manufacturing process, with points that fall inside of the decision boundary. As shown by the vertical line in FIG. 8, detection device 220 determines a first positive decision value at approximately time step 65.

In some implementations, detection device 220 may determine whether the manufacturing process has reached the steady state based on a decision value threshold. For example, detection device 220 may determine that the manufacturing process has reached the steady state when a decision value, associated with a point inside the decision boundary, satisfies a threshold. Using FIG. 8 as a particular example, if detection device 220 is configured to determine that the manufacturing process has reached the steady state when detection device 220 determines a positive decision value that is greater than or equal to 2.0, then detection device 220 may make such a determination at approximately time step 75.

As another example, detection device 220 may determine that the manufacturing process has reached the steady state when a number of consecutive decision values, representing spectral data associated with a number of consecutive time steps, satisfies a threshold. Using FIG. 8 as a particular example, if detection device 220 is configured to determine that the manufacturing process has reached the steady state when detection device 220 determines five consecutive positive decision values, then detection device 220 may make such a determination at approximately time step 69.

As another example, detection device 220 may determine that the manufacturing process has reached the steady state when a threshold number of consecutive decision values satisfy a threshold. Using FIG. 8 as a particular example, if detection device 220 is configured to determine that the manufacturing process has reached the steady state when detection device 220 determines three consecutive positive decision values that are greater than or equal to 1.0, then detection device 220 may make such a determination at approximately time step 68.

As another example, detection device 220 may be determine that the manufacturing process has reached the steady state when an average or a weighted average of a number of decision values (e.g., a series of consecutive positive decision values) satisfies a threshold. In some implementations, use of a decision value threshold may protect against an incorrect determination that the manufacturing process has reached the steady state (e.g., since the manufacturing process may be stochastic in nature).

As indicated above, FIG. 8 is provided merely as an illustrative example. Other examples are possible and may differ from what was described with regard to FIG. 8.

Returning to FIG. 6, if the manufacturing process has not reached the steady state (block 630—NO), then process 600 may include receiving additional spectral data associated with the manufacturing process (block 620). For example, detection device 220 may determine that the manufacturing process has not reached the steady state (e.g., that the manufacturing process is still in the unsteady state), and may wait to receive additional spectral data (e.g., collected at a next time step during the manufacturing process).

In some implementations, may determine, based on the additional spectral data, whether the manufacturing process has reached the steady state, in the manner described above. In some implementations, detection device 220 may continue receiving spectral data and determining whether the manufacturing process has reached the steady state until detection device 220 determines that the manufacturing process has reached the steady state.

As further shown in FIG. 6, if the manufacturing process has reached the steady state (block 630—YES), then process 600 may include determining a quantitative metric associated with the steady state (block 640). For example, detection device 220 may determine that the manufacturing process has reached the steady state, and may determine a quantitative metric associated with the steady state.

The quantitative metric may include a metric indicating a quantitative property associated with the steady state, such as a concentration of constituent parts of a compound at the steady state, a particle size at the steady state, and/or the like. In some implementations, a steady state, detected by detection device 220 based on the spectral data, may correspond to a particular composition of constituent compounds with particular physical properties, such as particle size. Thus, the quantitative metric may be predicted based on the spectral data associated with the steady state.

For example, in some implementations, detection device 220 may store or have access to a regression model (e.g., PLS regression model, a SVR model) that receives, as input, the spectral data based on which the steady state was detected, and provide, as output, the quantitative metric associated with the steady state. In this example, the output from the regression model may be, for example, a concentration of each constituent part of the compound, a particular size of the compound, and/or the like.

In some implementations, detection device 220 may store or have access to the regression model. Additionally, or alternatively, detection device 220 may generate the regression model (at an earlier time) based on the training spectral data and training quantitative data (e.g., information that identifies quantitative metrics corresponding to the training spectral data). In some implementations, the determination of the quantitative metric is optional.

As further shown in FIG. 6, process 600 may include providing an indication that the manufacturing process has reached the steady state and information associated with the quantitative metric (block 650). For example, detection device 220 may provide an indication that the manufacturing process has reached the steady state and information associated with the quantitative metric.

In some implementations, detection device 220 may provide the indication that the manufacturing process has reached the steady state and/or the information associated with the quantitative metric to another device, such as user device 230 (e.g., such that a user can be informed that the manufacturing process has reached the steady state and/or view the information associated with the quantitative metric).

Additionally, or alternatively, detection device 220 may provide the indication that the manufacturing process has reached the steady state in order to cause an action to be automatically performed. For example, detection device 220 may provide the indication to a device associated with performing the manufacturing process in order to cause the manufacturing process to stop the manufacturing process (e.g., stop a mixing process associated with the steady state), initiate a next step in the manufacturing process, cause the manufacturing process to be restarted (e.g., restart the mixing process on new raw materials), and/or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations described herein provide a detection device capable of generating a SVM classification model for determining whether a manufacturing process (e.g., a continuous manufacturing process, a batch manufacturing process, and/or the like) has reached a steady state, and determining, using the SVM classification model and based on multivariate spectral data associated with the manufacturing process, whether the manufacturing process has reached the steady state. In some implementations, the SVM classification model may take into account multiple variables (e.g., 80 variables, 120 variables, 150 variables, and/or the like), thereby increasing accuracy and/or robustness of the SVM classification model (e.g., as compared to a univariate technique or a PCA technique).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:

identifying, by a device, a support vector machine (SVM) classification model that is based on a final set of unsteady state data that includes spectral data measured before a dominant transition time of a plurality of transition times of a manufacturing process and a final set of steady state data that includes training spectral data measured one or more of at or after the dominant transition time of the plurality of transition times of the manufacturing process;

receiving, by the device and from one or more spectrometers, multivariate spectral data measured;

determining, by the device, based on receiving the multivariate spectral data from the one or more spectrometers, and using the SVM classification model that is based on the final set of unsteady state data and the final set of steady state data, that the manufacturing process has not reached a steady state at which a mixing process, included in the manufacturing process, is complete;

receiving, by the device and after determining that the manufacturing process has not reached the steady state at which the mixing process is complete, additional spectral data from the one or more spectrometers until the device determines that the manufacturing process has reached the steady state at which the mixing process is complete; and causing, by the device and after the device determines that the manufacturing process is at the steady state at which the mixing process is complete, an action that includes restarting the mixing process on new raw materials.

2. The method of claim 1, wherein determining that the manufacturing process has not reached the steady state at which the mixing process is complete:

providing the multivariate spectral data as input to the SVM classification model; and determining, based on an output of the SVM classification model, that the manufacturing process time has not reached the steady state at which the mixing process is complete.

3. The method of claim 1, further comprising:

determining, based on determining that the manufacturing process has reached the steady state at which the mixing process is complete, a quantitative metric indicating a particle size at the steady state or a concentration of constituent parts of a compound at the steady state; and providing information associated with the quantitative metric.

4. The method of claim 3, wherein the quantitative metric indicates a concentration of constituent parts of a compound at the steady state.

5. The method of claim 3, wherein determining the quantitative metric comprises:

providing, based on determining that the manufacturing process has reached the steady state at which the mixing process is complete, the multivariate spectral data as input to a regression model, and receiving the quantitative metric as output from the regression model.

6. The method of claim 1, wherein the multivariate spectral data comprises near infrared (NIR) spectra data that includes data associated with more than a hundred variables.

7. A device, comprising:

one or more memories; and one or more processors, coupled to the one or more memories, configured to:

identify a classification model that is based on a first set of data measured before a dominant transition time of a plurality of transition times of a manufacturing process and a second set of data measured one or more of at or after the dominant transition time of the plurality of transition times of the manufacturing process, wherein the classification model includes a support vector machine (SVM) classification model, and wherein the first set of data includes a set of unsteady state data that includes first spectral data measured before the dominant transition time;

receive, from one or more spectrometers, second spectral data measured during a performance of the manufacturing process;

determine, based on the second spectral data and using the classification model, that the manufacturing process is at a steady state at which a mixing process, included in the manufacturing process, is complete; and cause, based on the manufacturing process being at the steady state at which the mixing process is complete, an action that includes one or more of stopping the mixing process, initiating a next step in the manufacturing process, or restarting the mixing process on new raw materials.

8. The device of claim 7, wherein the one or more processors, to determine that the manufacturing process is at the steady state at which the mixing process is complete, are configured to:

determine that the manufacturing process has reached the steady state at which the mixing process is complete, and wherein the one or more processors are further configured to:

determine, based on determining that the manufacturing process has reached the steady state at which the mixing process is complete, a quantitative metric indicating a particle size at the steady state; and provide information associated with the quantitative metric.

9. The device of claim 7, wherein the second spectral data comprises multivariate spectral data.

10. A method, comprising:

receiving, from one or more spectrometers, multivariate spectral data measured during a performance of a manufacturing process;

determining, based on the multivariate spectral data and using a support vector machine (SVM) classification model that is based on a first set of data measured before a dominant transition time of a plurality of transition times of the manufacturing process and a second set of data measured one or more of at or after the dominant transition time, whether the manufacturing process is at a steady state of a mixing process included in the manufacturing process, wherein the first set of data includes a set of unsteady state data that includes spectral data; and causing, based on determining whether the manufacturing process is at the steady state, an action that includes one or more of stopping the mixing process, initiating a next step in the manufacturing process, or restarting the mixing process on new raw materials.

11. The method of claim 10, wherein the steady state indicates that the mixing process is complete.

12. The method of claim 10, wherein the mixing process includes a transition from an unsteady state at which properties, of materials and/or a compound, vary with time to the steady state at which the properties remain substantially constant with time.

13. The method of claim 10, wherein the plurality of transition times are predicted based on previous iterations of the SVM classification model.

14. The method of claim 10, wherein the dominant transition time is predicted with most occurrences among the plurality of transition times.

15. The method of claim 10, wherein determining whether the manufacturing process is at the steady state comprises:

determining that the manufacturing process is at the steady state based on the multivariate spectral data and based on a decision boundary of the SVM classification model.

16. The method of claim 10, further comprising:

receiving an indication that the manufacturing process is to be started or has been started; and identifying the SVM classification model based on receiving the indication that the manufacturing process is to be started or has been started and based on a detection device being configured to automatically monitor the manufacturing process in order to detect when the manufacturing process has reached the steady state.

17. The method of claim 10, wherein causing the action comprises:

causing, based on determining that the manufacturing process is at the steady state and after receiving the multivariate spectral data from the one or more spectrometers, an action that includes stopping a mixing process associated with the steady state.

18. The method of claim 10, wherein the dominant transition time is based on n iterations of the SVM classification model, and wherein n is greater than 1.

19. The method of claim 18, wherein the second set of data is a final set of steady state data that includes other spectral data measured at or after the dominant transition time.

20. The method of claim 10, wherein determining whether the manufacturing process is at the steady state comprises:

providing the multivariate spectral data as input to the SVM classification model; and determining, based on an output of the SVM classification model, whether the manufacturing process is at the steady state.

* * * * *